United States Patent [19]

Bartol

[11] Patent Number: 5,325,044

[45] Date of Patent: Jun. 28, 1994

[54] ELECTRONIC VOLTAGE REGULATOR PROTECTED AGAINST FAILURE DUE TO OVERLOAD, OR DUE TO LOSS OF A REFERENCE VOLTAGE

[76] Inventor: Luis E. Bartol, 5052 San Aquario Dr., San Diego, Calif. 92109

[21] Appl. No.: 765,145

[22] Filed: Sep. 24, 1991

[51] Int. Cl.$^5$ .................................... H02H 7/06
[52] U.S. Cl. .................................... 322/25; 322/28
[58] Field of Search .................. 322/25, 27, 28, 58, 322/59, 99

[56] References Cited

U.S. PATENT DOCUMENTS

| | | | |
|---|---|---|---|
| 3,843,921 | 10/1974 | Hill | 322/28 |
| 3,855,517 | 12/1974 | Allport | 322/28 X |
| 4,187,525 | 2/1980 | Nagura et al. | 322/25 X |
| 4,570,198 | 2/1986 | Storti et al. | 322/27 X |
| 4,570,199 | 2/1986 | Morishita et al. | 322/28 X |
| 4,658,200 | 4/1987 | Kouge | 322/25 |

Primary Examiner—Kristine L. Peckman
Attorney, Agent, or Firm—William C. Fuess

[57] ABSTRACT

An electronic voltage regulator, particularly a regulator of the voltage of a field coil of an alternator within a motor vehicle, is protected against catastrophic failure of its output transistor due to a short-circuit overload by action of a direct current (d.c.) electrical path within the circuit of the regulator. The d.c. path, preferably a single diode, discharges an existing capacitor present within an alternating current (a.c.) feedback path between the regulator's output transistor and its error amplifier stage. This discharge causes the output transistor to break into a safe, and non-destructive, oscillation for the duration of any overload. The same electronic voltage regulator is further, optionally, protected against a catastrophic failure of its output transistor due to a loss of the reference voltage supplied to the regulator. This protection is obtained by action of yet another, second, direct current (d.c.) electrical path. This second d.c. path, preferably a single resistor, serves, upon loss of a reference voltage to the voltage regulator, to couple voltage produced by the magnetic field within the field winding of the alternator back to the error amplifier stage of the regulator. This coupled voltage causes the error amplifier stage to, in turn, drive the regulator's output bipolar transistor to a condition where, by action of the first and the second paths, the bipolar transistor is safely maintained in an oscillatory condition until the reference voltage is restored.

14 Claims, 4 Drawing Sheets

ELECTRONIC VOLTAGE REGULATOR PROTECTED AGAINST FAILURE DUE TO OVERLOAD, OR DUE TO LOSS OF A REFERENCE VOLTAGE

BACKGROUND OF THE INVENTION

1. Field of the Invention

The present invention generally concerns electronic voltage regulators, such as those found in motor vehicles, that regulate the current in the field winding of an alternator in accordance with the level of a direct current, battery, voltage in accordance with a rectified voltage that is maintained by the alternator.

The present invention particularly concerns improvements to the electrical circuits of electronic voltage regulators which improvements are directed to protecting the regulators against (i) induced failure due to overload, and also, separately and additionally, (ii) induced failure due to loss of a reference voltage.

2. Background Art

Electronic voltage regulators are used with alternators in vehicular and other applications. A regulator applies a pulse-width-modulated voltage signal to the field winding of the alternator. The alternating current voltages correspondingly induced in the remaining windings of the alternator, normally three in number, are rectified, normally in a full bridge rectifier circuit, to produce a direct current. This direct current is applied, in parallel with the vehicle's battery, to power the electrical devices of the vehicle, and to maintain the charge of the battery.

The voltage regulator senses the battery voltage, or "B+", of the vehicle. It attempts, by variation in the duty cycle of the pulse-width-modulated output signal, to maintain this battery voltage constant. It so functions independently, within certain limits, of the electrical load on the battery voltage and/or the rotational speed of the vehicle's alternator.

Modern electronic voltage regulators, like most solid sate electronic devices, are intrinsically reliable; exhibiting a low failure rate when electrically connected, and used, as intended. However, electrically mis-connected or incompletely-connected voltage regulators can be subject to induced failures. Circuits are known in the electronic arts for the protection of medium- and high-power electronic devices against induced failure(s) due to over-voltage or over-current. However, most of these circuits are not readily adaptable to electronic voltage regulators. Moreover, because economy is desired in the construction of voltage regulators (which use very few components, and commonly as few as two transistors), these existing circuits generally seem too cumbersome and expensive to adapt for the electrical protection of electronic voltage regulators.

Accordingly, electronic voltage regulators, and especially those mass-produced for vehicular applications, are generally substantially internally unprotected against induced electrical failure. This is true even though the electrical environment in which such voltage regulators are used, and in which replacement voltage regulators are installed, is often hostile to the electrical integrity of the voltage regulators. The environment is so hostile as regards electrical phenomena (i) that are induced, such as lightning, (ii) that occur, over time, due to wear and deterioration of a vehicle's wiring and connectors, such as shorts and opens, and (iii) that result from electrical misconnection or cross-connection or selective non-connection due to human error.

The (i) climatic electrical adversities faced by a vehicular voltage regulator are wide-ranging and often severe, but thankfully rare. A vehicle within which a voltage regulator resides may be subject to electrostatic discharge (ESD) from lightning strikes or from contact with power lines. The immunity or tolerance of an electronic voltage regulator to (i)climatic electrical adversities is generally not the subject of the present invention. However, the circuits and circuit improvements of the present inventions will be seen to be both (i) totally compatible with proper design considerations regarding the climatic environment of use, and (ii) beneficial in avoiding induced failures resulting from such electrical rigors as naturally occur.

The major (ii) induced adverse electrical phenomena commonly encountered by a voltage regulator result from a short circuit, or partial short circuit, in the field winding of the alternator to which the voltage regulator is connected, or in the electrical connections to this field winding. Neither of these shorts are rare; both are regularly encountered during the decades-long life of an automotive vehicle. The output power transistor of the voltage regulator is normally unprotected against catastrophic overcurrent, and failure, from driving into a shorted load. A short in the field winding of an alternator generally results from a build-up of carbon dust, which build-up is especially likely to be troublesome when the groove between the slip rings of the alternator's shaft has worn to a shallow depth.

Because modern alternators of high quality are long wearing, in many vehicular applications it is probably equally or more likely that the electrical connection from a voltage regulator to the alternator will become shorted — inducing a catastrophic failure of the output transistor within the voltage regulator — as it is that the alternator will short internally. Avoidance of this failure mode is one reason that modern voltage regulators are often packaged integrally with the alternators that they regulate.

However, whether a voltage regulator is packaged separately from or integrally with an alternator, it is still subject to (iii) manually-induced electrical stresses. In fact, the greatest single environmental nemesis of a voltage regulator may be a human.

It is generally possible, and even desirable, for a human to obtain access to the output terminal of the voltage regulator — which terminal is connected to the field winding of the alternator — for the purposes of diagnosis, and modular repair, of failures occurring within the charging system of the vehicle. Historically, many mechanics of lessor skills or training have learned a "quick and dirty" way of confirming the presence of a voltage output from the voltage regulator, and within the field coil of the alternator, for the diagnostic purpose of isolating a charging system failure to the voltage regulator or to the alternator. This "quick and dirty" diagnostic method is to momentarily short the output terminal of the voltage regulator with a grounded screwdriver or the like, drawing an arc or spark. Some older mechanics even learned this technique as being sound practice in the bygone days of mechanical voltage regulators and generators. Alas, the very arc that indicates that an electronic voltage regulator is correctly functioning (at least to the extent of producing a voltage in the alternator's field coil) may induce its catastrophic failure.

Still another major failure mode of an electronic voltage regulator arises from human error. This failure mode of a voltage regulator occurs when the voltage reference to the voltage regulator is lost while the remaining voltage connection to the voltage regulator, and the voltage regulator's connection to the field coil of the alternator, are maintained. In an embodiment of an electronic voltage regulator where its bipolar PNP output transistor is connected between a positive, B+, battery voltage and the alternator's field coil, the loss of the voltage reference occurs when the remaining, ground, connection to the voltage regulator is lost. In an alternative embodiment of the electronic voltage regulator where its bipolar NPN output transistor is likewise connected (in the opposite sense) between ground and the alternator's field coil, the loss of the voltage reference occurs when the remaining, B+positive battery voltage, connection to the voltage regulator is lost.

When its voltage reference is lost the voltage regulator has no differential voltage upon which to base its output. It proceeds to "chase a ghost" as its rising voltage output produces no observable change in the battery voltage sensed. The voltage regulator "runs away" into a constant "on" condition of its output transistor, which subsequently fails from overcurrent.

This additional failure mode can arise from manual manipulation of the electrical connections to the voltage regulator, or from corrosion on the reference voltage terminal of the voltage regulator, or from any other cause of a loss of the integrity of the reference voltage connection. Most commonly, however, this loss of electrical integrity results when a careless, inattentive, or ignorant mechanic fails to tightly secure the case of the voltage regulator to the chassis ground of the vehicle.

According to this range of human maintainer-induced problems, a voltage regulator that is sold in the automotive aftermarket for installation by amateurs leads a hazardous, and failure-prone, existence. This fact is reflected in returns from the end item consumer of the voltage regulators that are alleged to have been defective on delivery, or to have failed in their infancy. Although the manufacturer of the voltage regulator often knows from the installation of the same voltage regulator in new vehicles, and/or from his quality and failure analysis programs, that the premature failure of the voltage regulator was very likely induced by its installer-purchaser, it is necessary to maintain a liberal return policy, accepting back for full credit all returned units, in order to secure consumer and retailer goodwill.

Accordingly, it would be very useful to a purchaser-installer, and a user (whether performing the installation or not), of a voltage regulator if some of the failure modes of the voltage regulator could be abated, and if the reliability of the voltage regulator increased. Although the purchaser-installer or user might neither recognize nor appreciate such increased reliability, it would inure to their benefit. Additionally, it would also be of immediate interest and advantage to a manufacturer of voltage regulators, especially of such voltage regulators as are sold as repair parts in the automotive after-market, if the rate of infancy failures of the units at the hands of the purchaser-installers could also be improved.

In still another area of the present technology of electronic voltage regulators, it is known that the junction size, current capacity, and rating of the output transistor — a major, typically 40%, cost driver in the entire electrical circuit of the regulator — can be minimized for a particular application rating of the voltage regulator if its bipolar output transistor is overdriven at its base junction, thereby permitting the transistor to operate more efficiently.

It may be correctly surmised that the circuits of the present invention — involved as they are in protecting a voltage regulator and its output transistor from catastrophic failure due to (i) a short circuit load and/or (ii) loss of a reference voltage — will somehow involve turning the output transistor "off" before it is destroyed. It would be very useful if this improvement in reliability could be accomplished without appreciably adversely affecting any other criteria of the voltage regulator's performance, particularly including its life cycle cost of ownership and operation. It would be particularly useful if any enhancements to the circuit of the voltage regulator did not degrade any normal overdrive of its output bipolar transistor, and did not adversely affect the cost or operational efficiency of this or of any other component within the voltage regulator.

SUMMARY OF THE INVENTION

The present invention contemplates protecting an electronic voltage regulator, particularly a regulator of the voltage (and current) of a field coil of an alternator within a motor vehicle, against induced catastrophic failure of its output transistor due to a short-circuit overload. The protection is realized by establishing a new direct current (d.c.) electrical path within the circuit of the regulator. In one preferred embodiment of the circuit the new path is implemented by a single diode.

The new d.c. path serves to discharge an existing capacitor that is within an existing alternating current (a.c.) feedback path between the regulator's output transistor and an error amplifier stage. This first path is accordingly called a (DIODE) D.C. DISCHARGE PATH. This discharge causes the output transistor to break into a safe, and non-destructive, oscillation for the duration of any overload.

The present invention further contemplates protecting the electronic voltage regulator against induced catastrophic failure of its output transistor due to a loss of a reference voltage that is supplied to the regulator. The protection is realized by optionally establishing yet another, second, new direct current (d.c.) electrical path within the circuit of the regulator. In one preferred embodiment of the circuit this second new path is implemented by a single resistor.

Upon loss of the reference voltage, the second new path serves to feed back a voltage produced by the collapsing magnetic field within the field winding of the alternator to the error amplifier stage of the regulator. This second path is accordingly called a (RESISTIVE) D.C. FEEDBACK PATH. The voltage that is fed back is fortuitously, and intentionally, prevented from undesirably taking a low impedance path to the base of a transistor within the error amplifier stage by an existing isolation diode. (This diode, which appears in some, but not all, previous voltage regulators, is necessary for correct operation of the second new path.) Instead, the fed back voltage is applied across the emitter-base junction of the transistor within the error amplifier stage, and then further through resistors back to the field winding. This path biases the error amplifier stage, causing it to turn on momentarily. This momentary turn-on will, in turn, drive the regulator's output bipolar transistor to a condition where, by action of the first new path, it is safely maintained in an oscillatory condition until the reference voltage is restored.

The second (RESISTIVE) D.C. FEEDBACK PATH, and the protection of the voltage regulator from loss of its reference voltage, is thus interoperative with the first (DIODE) D.C. DISCHARGE PATH, and with the separate protection of the voltage regulator from a short circuit in the field winding that is individually provided by the first path. The second path can be said to "trigger", or initiate, the protection provided by the first path incipiently upon a loss of reference voltage.

Both the new electrical paths are (i) inexpensive and (ii) reliable. While not themselves inducing any appreciable cost, nor appreciably adversely affecting reliability, the new and protective electrical paths have a highly beneficial effect upon the failure rate of a regulator in which they are installed. In one embodiment of the circuits, the infancy failure rate of electronic voltage regulators sold to the general public for use in vehicular applications was reduced by more than an order of magnitude.

In one, preferred, embodiment of the invention both the first and the second new d.c. paths may be employed within, and located relative to, the electrical circuit of an existing electronic voltage regulator. The existing voltage regulator is powered by a battery voltage, and serves to produce a regulated drive voltage in the field winding of an alternator. The existing voltage regulator has an error amplifier with a signal input port and a signal output port. The battery voltage is divided in a voltage divider and coupled to the signal input port of the error amplifier. For purposes including the correct operation of the second d.c. feedback path, this coupling is through a diode. (The diode also improves the noise immunity of the regulator, and, is thus commonly used.) The error amplifier produces an error output signal responsively to variations in the battery voltage. This error output signal is conducted in a direct current path from the signal output port of the error amplifier to an output stage, nominally a power transistor. The output stage transistor produces at its output port the drive voltage to the alternator field winding. A capacitor feedback path couples alternating current voltage from the output port of the output transistor back to the signal input port of the error amplifier in order to improve the response of the voltage regulator.

In accordance with the present invention, a first electrical circuit path, directed to protecting the output transistor means from destructive failure induced by a short circuit in the field winding, is implemented by addition of a single diode to the existing circuit. The diode connects the capacitor to a leg of the battery voltage in a sense that provides a direct current path for discharging the capacitor when the output transistor means is conducting.

The diode normally has little, or no, effect upon the operation of the voltage regulator. However, if a partial or total short-circuit in the external field circuit causes the current in the output transistor to rise to abnormally high levels then the (i) magnitude of the saturation voltage drop across the output transistor, and (ii) the rate of rise of this voltage, will, as fed back to the error amplifier through the capacitor feedback path, be sufficient so as to cause the error amplifier to, quickly and within a few microseconds, produce a signal turning the output transistor "off".

After an interval that is typically one hundred times (100×) longer, the output transistor will switch "on" again — only to cause the cycle to repeat all over again as a self-oscillation. This self-oscillation will persist, protecting the output transistor against catastrophic failure, for so long as the short circuit exists. When the short circuit is alleviated then normal operation of the voltage regulator will resume.

Still further in accordance with the present invention the same previous electronic voltage regulator may, optionally, be still further improved by the addition of still another new direct current, feedback, path. This second, feedback, path is between the output port of the output transistor and the input port of the error amplifier. It may be implemented in at least two different ways, both of which involve the addition of a single resistor to the existing circuit.

In a first embodiment of the second path it is installed in a first electronic voltage regulator that (i) receives a battery positive voltage and ground, (ii) has an error amplifier that includes a first bipolar transistor with series first and second resistors connected to its collector, and (iii) has an output transistor that includes a second bipolar transistor with a diode connected to its collector, and across the field winding.

In this first regulator the direct current second path consists of an added third resistor that connects the junction of the first and second resistors to the base of the first bipolar transistor. A direct current path for conduct of the current that flows due to a voltage developed across the field coil of an alternator in the event of a loss of a voltage reference to the regulator is thus established. This direct current path proceeds from the field coil through the diodes of the alternator and the parallel battery, across the emitter-base junction of the first transistor, through the added third resistor, through the second resistor, and through the diode back to the field coil.

Notably, this second oath is completely through circuit components inherent to the design of the regulator save for the added (third) resistor. Also notably, the path will not proceed as described (which is through resistances of high impedance) unless there is no alternative direct current path from the alternator's diodes, and from the battery, to the base junction of the first bipolar transistor. Such an alternative direct current path is prevented by a diode connecting to the base of the first bipolar transistor.

In accordance with the functional explanation previously given, current flow in the second path momentarily biases the first bipolar transistor to conduction, which serves, in conjunction with the first path, to shut off, and to preserve against catastrophic failure due to overcurrent, the second bipolar transistor of the output stage.

In a second, preferred, embodiment of the second path it is installed in a second electronic voltage regulator that again receives the battery positive battery voltage and ground. The error amplifier again includes a first bipolar transistor. (The number of collector resistors is irrelevant. The first bipolar transistor normally only possesses one such.) The output transistor again includes a second bipolar transistor with a diode connected to its collector, and across the field winding. A capacitor is connected in series with a first resistor which is in turn connected to the base of the first transistor. (Note that the "first" resistor of this second voltage regulator is distinctly not the "first" resistor of the first voltage regulator.)

A direct current path for conduction of the current that flows due to a voltage developed across the coil of an alternator in the event of a loss of a voltage reference to the regulator is thus established. This direct current path proceeds from the field coil through the diodes of the alternator and the parallel battery, through the emitter-base junction of the first bipolar transistor, through the first resistor, through the added second resistor and through the diode back to the field coil.

Notably, this second embodiment of the, second path is again completely through circuit components inherent in the design of the regulator save for the added (second) resistor. Again, the path will not proceed as described (which is through resistances of high impedance) unless there is no direct current path from the alternator diodes, and parallel battery, to the base junction of the first bipolar transistor. Such an alternative direct current path is again prevented by a diode connecting to the base of the first bipolar transistor.

These and other aspects and attributes of the invention will become increasingly clear upon reference to the following drawings and accompanying specification.

DESCRIPTION OF THE PREFERRED EMBODIMENT

The present invention is directed to protecting electronic voltage regulators, particularly those used in conjunction with alternators within the electrical charging system of motor vehicles, against induced failure (i) due to a short circuit in the field winding of the alternator, or (ii) due to a lack of a reference voltage to the voltage regulator.

Protection against short circuits is realized by a first new direct current path — normally through a single added diode and an existing resistor — within the existing circuit of an electronic voltage regulator.

Further, optional, protection against lack of a reference ground is realizable only when the first new path is implemented. This independent, and separate, protection and is likewise realized by another, second, new direct current path. This time the path normally involves the addition of but a single resistor. In order for this second path to function correctly an isolation diode which is normally, but not invariably, already present within the voltage regulator must be present. This existing isolation diode is not part of the circuit improvement of the present invention, but is interoperative with the circuit improvement of the present invention.

The two new paths operate to cause the bipolar power output transistor of the voltage regulator to oscillate between its conducting and non-conducting states for the duration of any short circuit, or any lack-of-voltage-reference condition. The duty cycle of the oscillation is such that neither the output transistor, nor any other component of the voltage regulator, is damaged. Upon any abatement of the short circuit, or the lack-of-reference-voltage, condition the voltage regulator will automatically commence, or recommence, to function normally.

Figure 1:
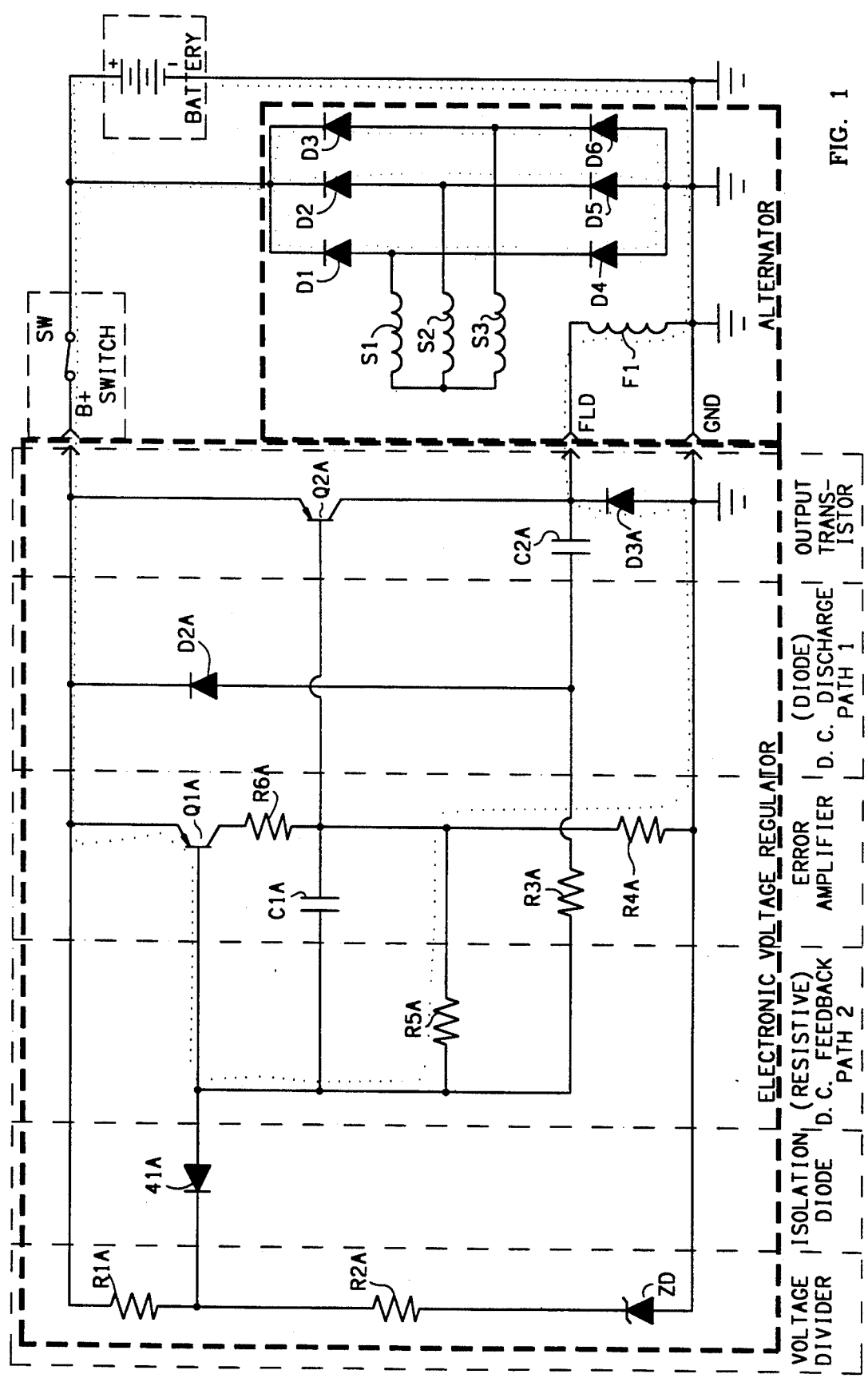
FIG. 1 is an electrical schematic diagram of a first embodiment, based on PNP transistors, of an electronic voltage regulator in accordance with the present invention incorporating a (DIODE) D.C. DISCHARGE PATH for protection against catastrophic failure due to overload, and also a (RESISTIVE) D.C. FEEDBACK PATH for protection against catastrophic failure due to loss of a reference ground.
Figure 2:
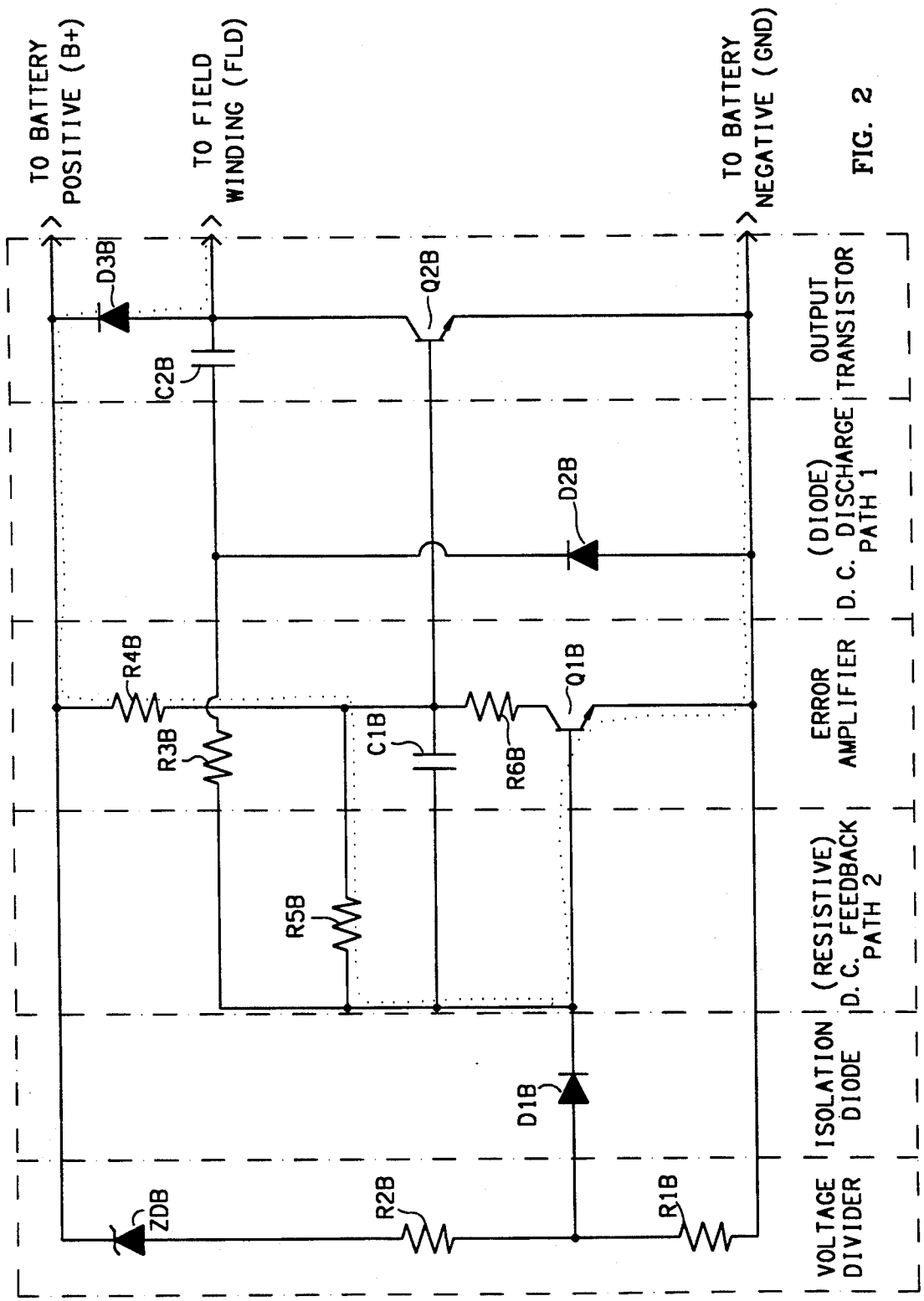
FIG. 2 is an electrical schematic diagram of a second embodiment, based on NPN transistors and complementary to the first embodiment shown in FIG. 1, of an electronic voltage regulator in accordance with the present invention, the regulator again incorporating a (DIODE) D.C. DISCHARGE PATH for protection against catastrophic failure due to overload, and also a (RESISTIVE) D.C. FEEDBACK PATH for protection against catastrophic failure due to loss of a reference positive voltage.

A first embodiment of an ELECTRONIC VOLTAGE REGULATOR in accordance with the present invention is shown in schematic diagram FIG. 1, and a complementary second embodiment based on NPN instead of PNP transistors is shown in FIG. 2. All component parts — but not necessarily the component values — of the voltage regulators shown in FIGS. 1 and 2 are previously known save only the two new direct current paths, and associated components, that are isolated in the drawings as the (i) (DIODE) D.C. DISCHARGE PATH, and the (ii) (RESISTIVE) D.C. FEEDBACK PATH. Both ELECTRONIC VOLTAGE REGULATORS of FIGS. 1 and 2 would be completely functional (proper component values being established) without inclusion of either of the new electrical paths: the (i) (DIODE) D.C. DISCHARGE PATH, or the (ii) (RESISTIVE) D.C. FEEDBACK PATH.

Namely, in the first, PNP, embodiment of FIG. 1 (in the second, NPN, embodiment of FIG. 2), the (i) diode D2A (the diode D2B), and the (ii) resistor R5A (the resistor R5B), are new components realizing new direct current electrical paths. The lack of these components and these paths will not effect the normal operation of the ELECTRONIC VOLTAGE REGULATOR.

Each ELECTRONIC VOLTAGE REGULATOR is connected between a battery positive voltage B+ and a ground GND that is produced in part by an external BATTERY and in part by an ALTERNATOR. Each ELECTRONIC VOLTAGE REGULATOR produces an output voltage FLD which is impressed across the field winding F1 of an ALTERNATOR. As the rotor (not shown) of the ALTERNATOR turns under mechanical force an alternating current is induced in its stator coils S1-S3.

The ELECTRONIC VOLTAGE REGULATOR shown in FIGS. 1 and 2 is particularly for use with alternators employed in vehicular applications. The REGULATOR applies a pulse-width-modulated voltage signal to the field winding F1 of the ALTERNATOR to maintain a constant voltage output at "B+" independently (within certain limits) of the load and the rotational speed of the ALTERNATOR.

The PNP (NPN) embodiment ELECTRONIC VOLTAGE REGULATOR of FIG. 1 (FIG. 2) operates as follows. When switch SW (shown in FIG. 1 only) is closed (as it normally is during operation), a VOLTAGE DIVIDER network made up with resistors R1A, R2A (R1B, RlB) and Zener Diode ZA (ZB), produces a voltage drop across R1A (R1B). Variations in this voltage drop are coupled by the anode-cathode (A-K) of ISOLATION DIODE D1A (D1B) to be applied across the series combination base-emitter (B-E) junction of Q1A (Q1B). Transistor Q1A (Q1B) and its associated biasing circuitry constitute the ERROR AMPLIFIER.

If the voltage drop across R1A (R1B) is smaller than the added barrier voltages of $(B-E)_{Q1A}$ $((B-E)_{Q1B})$ and $(A-K)_{D1A}$ $((A-K)_{D1B})$, then Q1A (Q1B) is OFF, and consequently Q2A (Q2B) will be fully ON (meaning saturated) because of emitter-base current of Q2A (Q2B) flowing through resistor R4A (R4B). Battery current will then flow in the alternator field winding F1. At this point, capacitor C2A (C2B) will be discharged through D2A (D2B) and the emittercollector (E-C) junction of Q2A (Q2B).

With the ALTERNATOR rotating (through mechanical coupling to the vehicle's engine,) an alternating voltage is developed in the With the ALTERNATOR rotating (through mechanical coupling to alternator's stator windings S1-S3 (shown in FIG. 1). After rectification of this alternating voltage by the diodes D1-D6 (shown in FIG. 1) making a full wave 3-phase rectifier bridge, this rectified voltage appears across the BATTERY as the regulated, "bus", voltage "B+".

If the existing conditions in the electrical system are such that the generated DC voltage applied to "B+" keeps rising, a cut-off point will be reached when the voltage drop across R1A (R1B) allows sufficient conduction in Q1A (Q1B) so as to start turning Q2A (Q2B) OFF — usually at 14 volts for the component values listed hereinafter. (An ELECTRONIC VOLTAGE REGULATOR may also be configured, for example, to operate at 12 or 24 nominal volts.) From this point on, Q2A (Q2B) turns off rapidly due to the positive a.c. feedback through the path consisting of R3A (R3B) and C2A (C2B). The field current is suddenly interrupted and diode D3A (D3B) provides a discharge path for the accumulated field energy. At this point, capacitor C2A (C2B) is charged to approximately $V_{B+}$.

As the previous condition persists, $V_{B+}$ starts decreasing. Eventually VR1 will be insufficient to keep Q1A (Q1B) turned firmly ON and, thus, Q2A (Q2B) turned firmly OFF. From this point on, Q2A (Q2B) turns ON rapidly, producing a residual voltage across C2A (C2B) that is the sum of the voltage drops across the anode-cathode of D2A (D2B) and the collector-emitter junction of Q2A (Q2B). When Q2A (Q2B) finally turns fully ON, the external field winding current is restored and the regulation cycle is repeated indefinitely.

If due to any reason, i.e., a partial or a dead short across the alternator field winding, the current through Q2A (Q2B) should rise abruptly, then Q2A (Q2B) will start towards self-destruction. The rate of current rise will be limited only by the distributed inductance associated with the collector-emitter circuit of Q2A (Q2B). The current rise will produce an increasing voltage drop across the collector-emitter junction of Q2A (Q2B). This increasing voltage drop is coupled to the base-emitter junction of Q1A (Q2A) through the feedback network consisting of R3A (R3B) and C2A (C2B). If the collector-emitter voltage drop rises sufficiently fast and is of large enough amplitude, then Q1A (Q1B) will be turned ON since C2A (C2B) will always start the Q2A (Q2B) ON-cycle discharged and the fast-rising voltage wavefront across collector-emitter of Q2A (Q2B) will produce a firing pulse in Q1A (Q1B) within a few microseconds after the fast rising wavefront appears.

The positive feedback network of R3A (R3B) and C2A (C2B) will latch the ON-state of Q1A (Q1B), consequently turning Q2A (Q2B) OFF. Diode D1A (D1B) steers the current resulting from the collector-emitter voltage drop of Q2A (Q2B) into the base-emitter junction of Q1A (Q1B) and the feedback network of R3A (R3B) and C2A (C2B). Accordingly, the charge in C2A (C2B) is solely the result of the collector-emitter voltage drop in Q2A (Q2B). By judicious selection of the parametric values of R3A (R3B), C2A (C2B), Q1A (Q1B) and Q2A (Q2B), the duty cycle of Q2A (Q2B) under overload conditions can be made sufficiently small so as to indefinitely withstand without damage the overload condition over the full operating temperature range of the ELECTRONIC VOLTAGE REGULATOR.

Capacitor C1A (C1B), connected across the base-collector junction of Q1A (Q1B), serves to stabilize transistor Q1A (Q1B), avoiding false firing of overload protection circuitry because of electrical noise present in the vehicle's electrical system.

The present invention further concerns an electronic reference-voltage-loss protection circuit (a ground loss in the circuits of FIGS. 1 and 3; and a loss of the battery "B+" voltage in the circuits of FIGS. 2 and 4) specifically designed to avoid catastrophic failure in the output transistor of an ELECTRONIC VOLTAGE REGULATOR (particularly as used in vehicular applications). The protection circuit operates when the voltage across this output transistor rises to abnormally high levels resultant from the inductive discharge of an alternator field winding under steady state or intermittent reference-voltage-loss conditions. Also, this circuit prevents regulator runaway, a condition associated with the reference-voltage-loss condition.

A first embodiment of the reference-voltage-loss protection circuit of the present invention is also shown in its NPN and PNP versions in respective FIGS. 1 and 2. An alternative preferred, second, embodiment of the reference-voltage-loss protection circuit of the present invention is shown, again in its NPN and PNP versions, in respective FIGS. 3 and 4.

The reference-voltage-loss protection circuit is specifically designed to avoid catastrophic failure in the output transistor of an ELECTRONIC VOLTAGE REGULATOR (particularly as used in vehicular applications), as well as avoiding electrical stresses to the vehicle's alternator, battery and associated loads when the voltage reference to the regulator is lost because of an abnormal open circuit condition. The electrical voltage reference (which is lost) is the battery negative, or ground GND in the PNP versions of FIGS. 1 and 3, and is the battery positive, or voltage B+, in the NPN versions of FIGS. 2 and 4. This reference voltage may become lost because of broken, intermittent or otherwise inadequate electrical connection between the vehicle's wiring and the voltage regulator's terminals. Such an inadequate electrical connection causing an open circuit condition may typically be caused by a corrosion, by mechanically parted cables or connectors, or by intentional human intervention.

Two embodiments of the voltage-reference-loss protection circuit of the present invention are shown in FIGS. 1,2 and 3,4. However, other circuit configurations are possible. Each circuit embodiment and version senses the voltage-reference-loss because of a high voltage pulse that is developed by the field coil F1 (shown in FIG. 1) of the alternator upon loss of the reference voltage to the regulator. For example, in the circuit versions of FIGS. 1 and 3, loss of the reference ground GND to the ELECTRONIC VOLTAGE REGULATOR will leave a magnetic field in the field coil. The loss of the reference voltage to the ELECTRONIC VOLTAGE REGULATOR makes this field reverse polarity relative to the ELECTRONIC VOLTAGE REGULATOR. (In the electronic circuit schematic convention where a "dot" next to one end of a coil indicates polarity, the loss of the reference voltage is as if the "dot" changes ends on the coil F1.) This causes a high voltage pulse to the ELECTRONIC VOLTAGE REGULATOR.

This high voltage pulse inherently appears across the collector-emitter junction of the OUTPUT TRANSISTOR Q2A (Q2B) in the first embodiment (FIGS. 1,2), or across OUTPUT TRANSISTOR Q2C (Q2D) in the second embodiment. The circuit discriminates this pulse and uses it for starting self-oscillations in the regulator's control circuit. These self-oscillations result in a low duty factor in the OUTPUT TRANSISTOR, causing very little excitation current to flow into the ALTERNATOR's field and preventing the ALTERNATOR runaway condition normally associated with reference voltage loss.

The first (second) embodiment circuit of this aspect of the present invention is shown in FIGS. 1 and 2 (3 and 4). When the reference lead (the ground GND in the PNP circuit versions of FIGS. 1 and 3, and the battery voltage B+ in the NPN circuit versions of FIGS. 2 and 4) is accidentally disconnected through a corroded, intermittent or broken connection, then the discharge path of flywheel diode D3A, D3B (D3C, D3D) is suddenly opened. As a consequence, a high voltage pulse is applied across the collector-emitter junction of OUTPUT TRANSISTOR Q2A, Q2B (Q2C, Q2D). The magnitude and energy content of this pulse depend on several factors; such as the instantaneous current flowing in the field at the time of reference-loss, the value of the field's inductance, the external and electrical load present in the vehicle's generating circuit, and the distributed impedance associated with the vehicle's wiring, etc.

If the voltage pulse developed from the loss of the voltage reference is of sufficient amplitude and contains sufficient energy, a catastrophic second breakdown condition will occur in OUTPUT TRANSISTOR Q2A, Q2B (Q2C, Q2D). The impedance values of series-connected R1, R2 and ZD, in parallel with series-connected Q1 and R4 (and also R6 in the first embodiment of FIGS. 1,2), are designed to drain considerable amounts of energy from the unclamped inductive pulse, thus radically lowering the probability of OUTPUT TRANSISTOR failure. In the preceding sentence "R1" will be understood to include R1A, R1B (R1C, R1D), "R2" to include R2A, R2B (R3A, R3B) and ZD to include and ZDA, ZDB (ZDC, ZDD) in the circuit embodiments of FIGS. 1,2 (3,4). Likewise, "Q1" will be understood to include Q1A, Q1B (Q1C, Q1D), and "R4" to include R4A, R4B (R4C, R4D), and "R6" to include R6A, R6B in the circuit embodiments of FIGS. 1,2 (3,4).

Once the energy of the inductive pulse is safely dissipated, resistor R5A, R5B (R5C, R5D) connected in a positive feedback configuration between Q1A, Q1B (Q1C, Q1D) and Q2A, Q2B (Q2C, Q2D) will force the circuit to self-oscillate with a low duty cycle because of the high impedance value of field inductance and feedback resistor R5A, R5B (R5C, R5D). The precise manner by which resistor R5A, R5B (R5C, R5D) so functions is as follows. The biasing of ERROR AMPLIFIER transistor Q1A, Q1B (Q1C, Q1D) that is realized by the direct current feedback path (shown in dotted line in all embodiments and all versions of FIGS. 1-4 that proceeds through R5A, R5B (R5C, R5D) will cause this error amplifier transistor Q1A, Q1B (Q1C, Q1D) to conduct. Accordingly, OUTPUT TRANSISTOR Q2A, Q2B (Q2C, Q2D) will, at least initially, be forced into non-conduction. Eventually, in time, the OUTPUT TRANSISTOR Q2A, Q2B (Q2C, Q2D) will recommence conduction. However, the continuing conduction of OUTPUT TRANSISTOR Q2A, Q2B (Q2C, Q2D) will then, by operation of the first (DIODE) D.C. DISCHARGE PATH, serve to trigger the self-oscillatory behavior.

Accordingly the second, (RESISTIVE) D.C. FEEDBACK PATH of the present invention is interoperative with the first, (DIODE) D.C. DISCHARGE PATH. Accordingly, the output FLD of the ELECTRONIC VOLTAGE REGULATOR will not run away, possibly saving the ALTERNATOR and external loads on the battery circuit of the vehicle, as well as the ELECTRONIC VOLTAGE REGULATOR itself, from destruction.

The preferred components, and component values, for all circuit embodiments are given in the following table. All components with an identification ending in "A" are shown within FIG. 1; with an identification ending in "B" within FIG. 2; with an identification ending in "C" within FIG. 3; and with an identification ending in "D" within FIG. 4. Not all components appear in all embodiments, and all variants, of the circuits of the present invention.

| COMPONENT | VALUE |
| --- | --- |
| R1 (A,B) | 470 ohm, ¼ watt adjustable resistor |
| R1 (C,D) | 56 ohm, ¼ watt adjustable resistor |
| R2 (A,B) | 1,500 ohm, ¼ watt adjustable resistor |
| R2 (C,D) | 150 ohm, ¼ watt adjustable resistor |
| R3 (A,B) | 560 ohm ¼ watt carbon film resistor |
| R3 (C,D) | 330 ohm ¼ watt carbon film resistor |
| R4 (A,B) | 1,200 ohm ¼ watt carbon film resistor |
| R4 (B,C) | 280 ohm 1 watt carbon film resistor |
| R5 (A-D) | 220 kilohm ¼ watt carbon film resistor |
| R6 (A,B) | 22 ohm ¼ watt carbon film, resistor |
| C1 (A,B) | .022 microfarad 25 volt (±20%) ceramic |

-continued

| COMPONENT | VALUE |
| --- | --- |
| | capacitor type Y5S or equivalent |
| C1 (C,D) | .068 microfarad 25 volt (±20%) ceramic capacitor type Y5S or equivalent |
| C2 (A,B) | .047 microfarad 25 volt (±20%) ceramic capacitor type Y5S or equivalent |
| C2 (C,D) | .068 microfarad 25 volt (±20%) ceramic capacitor type Y5S or equivalent |
| D1 (A-D) | silicon diode type 1N4148 or equivalent |
| D2 (A-D) | silicon diode type 1N4148 or equivalent |
| D3 (A-D) | 1 ampere × 200 volt rectifier type 1N4003 or equivalent |
| Q1A | high gain PNP small transistor type 2N5087 or equivalent |
| Q1C | high gain PNP small transistor type PN200A or equivalent |
| Q1B | high gain NPN small transistor type 2N5088 or equivalent |
| Q1D | high gain NPN small transistor type PN100A or equivalent |
| Q2 (A,C) | power darlington PNP transistor type TIP 105 or equivalent (8 ampere × 60 volts) |
| Q2 (B,D) | power darlington NPN transistor type TIP 100 or equivalent (8 ampere × 60 volts) |
| ZD (A-D) | 10 volt, ½ watt, 5% Zener diode type 1N758A or equivalent |

A recapitulation of the organization, and the function, of the two circuit paths of the present invention is as follows:

The paths are within an ELECTRONIC VOLTAGE REGULATOR that produces a pulse-width-modulated drive signal FLD across the field winding F1 of an ALTERNATOR. The VOLTAGE REGULATOR is connected across a battery voltage (B+ to GND). It has an ERROR AMPLIFIER with a signal input port and a signal output port. The ERROR AMPLIFIER selectively conducts in response to variations in the battery voltage so as to produce, responsively to variations in the battery voltage, a control signal (alternatively called an error signal). The ERROR AMPLIFIER is connected by a direct current path from its signal output port to an OUTPUT TRANSISTOR. The OUTPUT TRANSISTOR is responsive to the control signal for selectively conducting so as to produce at its output port the pulse-width-modulated drive signal. A capacitor feeds back an alternating current in a feedback path from the output port of the OUTPUT TRANSISTOR to the signal input port of the ERROR AMPLIFIER (primarily for purposes of shaping a waveform of the pulse-width-modulated signal). This much of the circuit of the ELECTRONIC VOLTAGE REGULATOR is conventional.

Within this circuit a first path is directed to protecting the OUTPUT TRANSISTOR from destructive failure induced by presentation of an abnormally low impedance to the pulse-width-modulated drive signal, such as would result, for example, from a short circuit in the field winding of the ALTERNATOR. The first path may be referenced — by example only because the following description is applicable to both versions of the ELECTRONIC VOLTAGE REGULATOR (and there is but one embodiment of the first path shown in all the drawings Figures) — relative to FIG. 1. In FIG. 1 the first path consists of a diode D2A connecting the capacitor C2A to a leg (B+) of the battery voltage in a sense that provides a direct current path for discharging the capacitor C2A when the OUTPUT TRANSISTOR Q2A is conducting.

Upon any and all such times as the pulse-width-modulated FLD drive signal is attempted to be driven into any such abnormally low impedance as causes the current in a conducting OUTPUT TRANSISTOR Q2A to rise precipitously, then the existing feedback path through the capacitor C2A is, by dint of its early discharge through the diode D2A, fast enough, in conjunction with a response time of the ERROR AMPLIFIER, so as to drive the OUTPUT TRANSISTOR Q2A to a non-conducting state before damage of the output transistor means is sustained. At a time after being so driven to the non-conducting state, the OUTPUT TRANSISTOR Q2A will recommence to conduct. However, it will so shortly thereafter to be safely rendered non-conducting all over again so as to avoid induced damage from overcurrent. By this self-oscillating operation it will be continuously precluded that the OUTPUT TRANSISTOR Q2A should ever be damaged. The VOLTAGE REGULATOR is thus protected from catastrophic induced failure of its OUTPUT TRANSISTOR Q2A resultant from any attempt to drive into an abnormally low impedance.

The second path may also be referenced — again by example only because the following description is applicable to both embodiments of the second path (shown in FIGS. 1,2 and 3,4), and to both the PNP and NPN versions of the ELECTRONIC VOLTAGE REGULATOR — relative to FIG. 1. The second path is a direct current feedback path between the output port of the OUTPUT TRANSISTOR Q2A and the input port of the ERROR AMPLIFIER. It serves to couple the voltage generated from a magnetic field in the field winding F1 of the ALTERNATOR — upon occasion of a loss of a reference voltage (GND) to the VOLTAGE REGULATOR — to the input port of the ERROR AMPLIFIER, and further in a closed loop back to the field winding F1.

This second path serves to, incipiently upon such times as the ALTERNATOR looses its voltage reference, temporarily bias the ERROR AMPLIFIER means to conduction, therein to cause temporary nonconduction of the OUTPUT TRANSISTOR Q2A. Eventually, over time, the OUTPUT TRANSISTOR Q2A will recommence to conduct. This conduction of the OUTPUT TRANSISTOR Q2A will, by action of the diode D2A, cause a commencement of the self-oscillatory behavior. The self-oscillatory behavior will protect the OUTPUT TRANSISTOR Q2A, and all other components of the VOLTAGE REGULATOR, from induced catastrophic failure for the duration of any lack of the reference voltage (the GND).

In its first embodiment shown in FIG. 1 the second path is enabled in an ELECTRONIC VOLTAGE REGULATOR connected between a battery positive voltage B+ and a ground GND. The ERROR AMPLIFIER includes a first bipolar transistor Q1A with a series-connected first resistor R6A and a second resistor R4A connected to its collector. The OUTPUT TRANSISTOR Q2A includes a second bipolar transistor Q2A with a diode D3A connected to its collector, and across the field winding F1.

In this ELECTRONIC VOLTAGE REGULATOR the first embodiment of the direct current path consists of a third resistor R5A connecting the junction of first resistor R6A and the second resistor R4A to the base of the first transistor Q1A. A direct current second path is thus established from the ALTERNATOR's field winding through the alternator diodes and parallel BATTERY to the ground GND, through the emitter-base junction of transistor Q1A, through R5A, through diode D3A and back to the ALTERNATOR's field winding.

Figure 3:
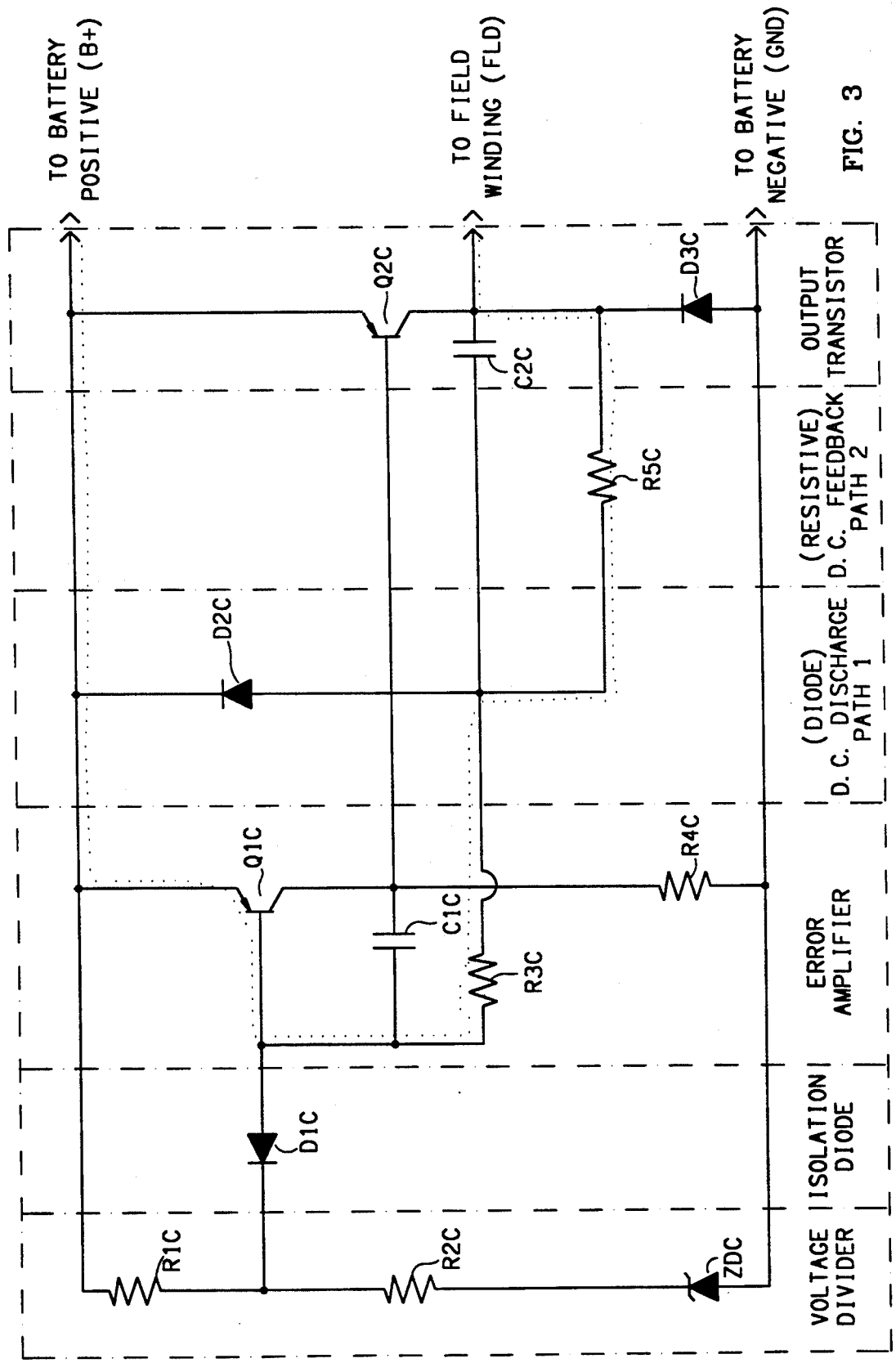
FIG. 3 is an electrical schematic diagram of a preferred third embodiment, based on PNP transistors, of an electronic voltage regulator in accordance with the present invention, the regulator again incorporating a (DIODE) D.C. DISCHARGE PATH for protection against catastrophic failure due to overload, and also a (RESISTIVE) D.C. FEEDBACK PATH for protection against catastrophic failure due to loss of a reference ground.

In its second embodiment shown in FIG. 3 the second path is enabled in an ELECTRONIC VOLTAGE REGULATOR again connected between a battery positive voltage B+ and a ground GND. The ERROR AMPLIFIER again includes a first bipolar transistor Q1C. The OUTPUT TRANSISTOR again includes a second bipolar transistor Q2C with a diode D3C connected to its collector, and across the field winding F1. The VOLTAGE REGULATOR further includes a series connected capacitor C2C and first resistor R3C for feeding back an alternating current signal from the output signal port of the OUTPUT TRANSISTOR Q2C to the base of the first transistor Q1C.

In this ELECTRONIC VOLTAGE REGULATOR the second embodiment of the direct current path consists of a second resistor R5C bypassing (i.e., connected in electrical parallel with) the capacitor C2C and in electrical series with the first resistor R3C. A direct current connection is accordingly made from the alternator's field winding to the input port of the error amplifier via the voltage reference which is in this case (of FIG. 3) the ground, through the parallel-connected alternator diodes and battery, and to the emitter-base junction of the first bipolar transistor Q1C. (The direct current path is further, in the closed circular loop back to the alternator's field winding F1, through the emitter-base junction of the first transistor Q1C, and through the series-connected first resistor R3C and the second resistor R5C back to the alternator's field winding F1.)

Figure 4:
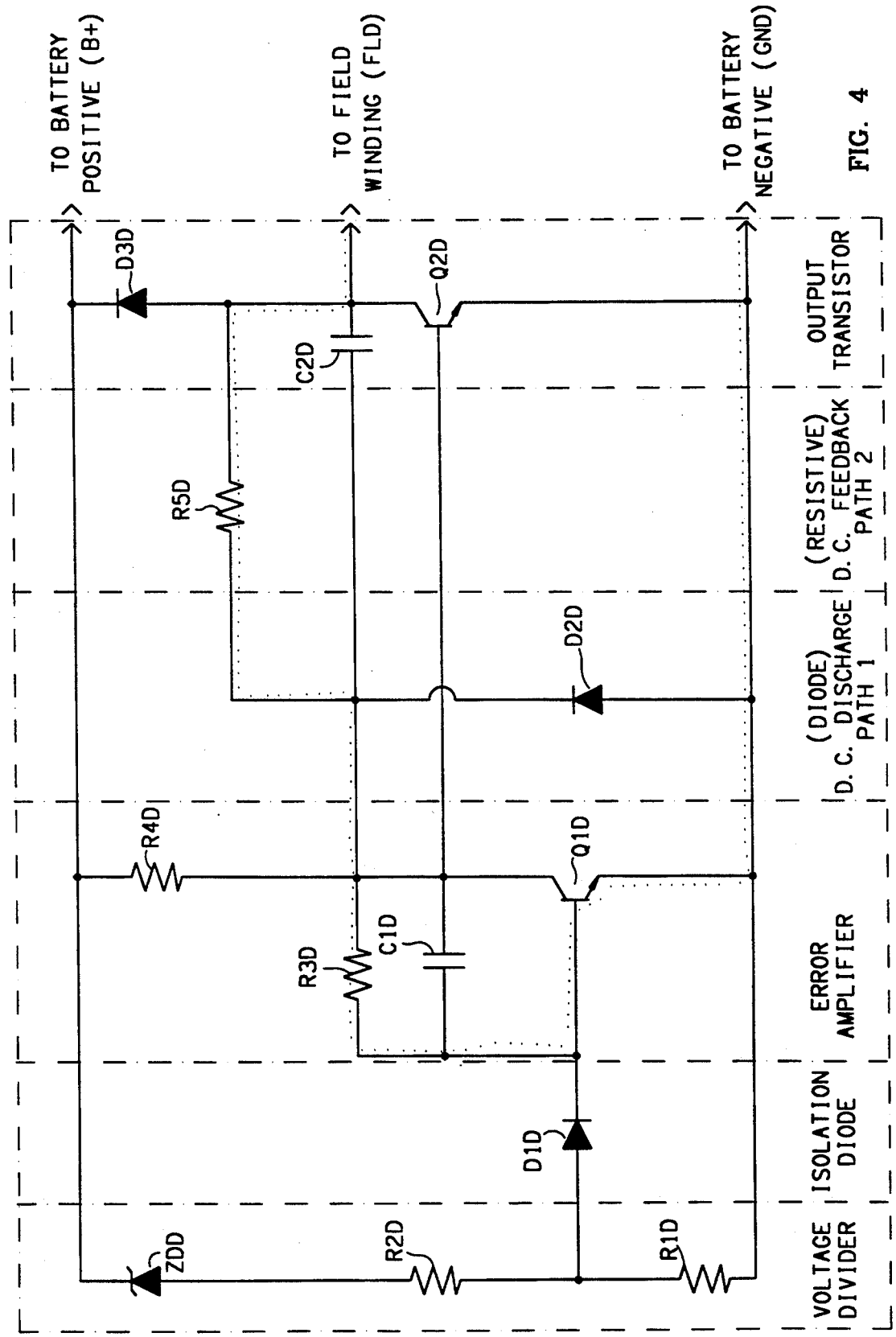
FIG. 4 is an electrical schematic diagram of a preferred fourth embodiment, based on NPN transistors and complementary to the third embodiment shown in FIG. 3, of an electronic voltage regulator in accordance with the present invention, the regulator again incorporating a (DIODE) D.C. DISCHARGE PATH for protection against catastrophic failure due to overload, and also a (RESISTIVE) D.C. FEEDBACK PATH for protection against catastrophic failure due to loss of a reference positive voltage.

The first and the second embodiments of the circuit of the present invention when implemented with NPN bipolar transistors are shown, respectively, in FIGS. 2 and 4. The proceeding description of the second direct current path for the PNP circuit embodiments shown in FIGS. 1 and 3 is generally applicable to these NPN circuit embodiments with obvious differences in the location of the field winding and in the semiconductor polarities.

In accordance with the preceding explanation and the several embodiments and versions within which the present invention has been shown, the invention should be interpreted broadly, in accordance with the following claims only, and not solely in accordance with those particular embodiments and versions within which the invention has been taught.

What is claimed is:

1. In an electronic voltage regulator that produces a pulse-width-modulated signal across the field winding of an alternator, the voltage regulator being connected across a battery that develops a voltage between a positive terminal and a negative terminal, the voltage regulator having
    an error amplifier means, having a signal input port and a signal output port, for selectively conducting respective to variations in the voltage of the battery so as to produce a control signal, the error amplifier means connected by a direct current path from its signal output port to
    an output transistor means responsive to the control signal for selectively conducting so as to produce at its output port the pulse-width-modulated signal, and
    a capacitor means for feeding back alternating current in a feedback path from the output port of the output transistor means to the signal input port of the error amplifier means, an improvement to the voltage regulator directed to protecting the output transistor means from destructive failure induced by an abnormally low impedance at its output port, the improvement comprising:
    a diode means connecting the capacitor means to one of the voltage terminals of the battery in a sense that provides a direct current path for discharging the capacitor means when the output transistor means is conducting;
    whereupon any such times as the output transistor means attempts to drive the pulse-width-modulated signal into any such abnormally low impedance as causes the current in the output transistor means to rise precipitously, then the feedback path through the capacitor means is, by action of its timely discharge through the diode means, sufficiently fast enough, in conjunction with a response time of the error amplifier means, so as to drive the output transistor means to a non-conducting state before damage of the output transistor means is sustained;
    whereupon, at a time after being so driven to the nonconducting state, the output transistor means will recommence to conduct but will then so shortly thereafter be safely rendered non-conducting all over again so as to continuously preclude, in a self-oscillating manner, that the output transistor means should ever be damaged;
    wherein the voltage regulator is protected from induced catastrophic failure of the output transistor means resultant from any attempt of the output transistor means to drive into an abnormally low impedance.

2. The electronic voltage regulator according to claim 1 receiving a reference voltage from a source of reference voltage, the voltage regulator further comprising:
    a direct current feedback path between the output port of the output transistor means and the input port of the error amplifier means;
    wherein the path serves, incipiently upon occasion of any loss of the reference voltage to the regulator, to coupled a voltage generated from a magnetic field in the field winding of the alternator to the input port of the error amplifier means, and further in a closed circular loop back to the field winding, in a manner so as to bias the error amplifier means to conduction therein to temporarily cause nonconduction of the output transistor means;
    wherein the caused temporary non-conduction of the output transistor means will in time, by action of the diode means, cause commencement of the self-oscillating;
    wherein the voltage regulator is protected from catastrophic failure of its output transistor means resultant from a loss of the reference voltage to the voltage regulator.

3. The electronic voltage regulator according to claim 2 connected between the positive voltage terminal of the battery and a ground wherein the error amplifier means comprises:
    a first bipolar transistor with series-connected first and second resistors between its collector and the reference voltage; wherein the output transistor means comprises:

a second bipolar transistor with a diode connected to its collector, and across the alternator's field winding; and wherein the direct current path comprises:
a third resistor connecting a junction of the series-connected first and second first resistors to the base of the first transistor;
whereby the direct current path from the alternator's field winding to the input port of the error amplifier means proceeds via the source of reference voltage, through the alternator diodes and the battery that are in parallel, and to the emitter-base junction of the first transistor;
whereby the direct current path proceeds further, in a closed circular loop back to the alternator's field winding, through the emitter-base junction of the first transistor, through the third resistor, through the second resistor, and through the diode back to the alternator's field winding.

4. The electronic voltage regulator according to claim 3 wherein the first bipolar transistor of the error amplifier means comprises:
a PNP transistor with the series-connected first and second resistors connected between its collector and the ground; wherein the second bipolar transistor of the output transistor means comprises:
a PNP transistor with the diode connected between its collector and the ground, and across the alternator's field winding;
wherein the third resistor connects the junction of the series-connected first and second resistors to the base of the first PNP transistor;
whereby the direct current path from the alternator's field winding to the input port of the error amplifier proceeds via the ground, through the alternator diodes and the battery that are in parallel, and to the emitter-base junction of the first PNP transistor;
whereby the direct current path proceeds further, in the closed circular loop back to the alternator's field winding, through the emitter-base junction of the first PNP transistor, through the third resistor, through the second resistor, and through the diode back to the alternator's field winding.

5. The electronic voltage regulator according to claim 3 wherein the first bipolar transistor of the error amplifier means comprises:
an NPN transistor with the series-connected first and second resistors connected between its collector and the positive voltage terminal of the battery; wherein the second bipolar transistor of the output transistor means comprise:
an NPN transistor with the diode connected between its collector and the positive voltage terminal of the battery, and across the field winding;
wherein the direct current path's third resistor connects the junction of the series-connected first and second resistors to the base of the first NPN transistor;
whereby the direct current path from the alternator's field winding to the input port of the error amplifier proceeds via the diode, through the second resistor and through the third resistor and to the emitter-base junction of the first NPN transistor;
wherein the direct current path proceeds further, in the closed circular loop back to the alternator's field winding, through the emitter-base junction of the first NPN transistor and through the alternator diodes and the battery that are in parallel back to the alternator's field winding.

6. The electronic voltage regulator according to claim 2 connected between the positive voltage terminal of the battery and a ground wherein the error amplifier means comprises:
a first bipolar transistor; wherein the output transistor means comprises:
a second bipolar transistor with a diode connected to its collector, and across the alternator's field winding; wherein the voltage regulator further comprises:
a series-connected capacitor and a first resistor for feeding back an alternating current signal from the output signal port of the output transistor means to the base of the first transistor;
and wherein the direct current path comprises:
a second resistor bypassing the capacitor and in series with the first resistor so as to make a direct current connection from the diode to the base of the first transistor;
whereby the direct current path from the alternator's field winding to the input port of the error amplifier proceeds via the source of voltage reference, through the alternator diodes and the battery that are in parallel, and to the emitter-base junction of the first bipolar transistor;
whereby the direct current path proceeds further, in a closed circular loop back to the alternator's field winding, through the emitter-base junction of the first transistor, through the first resistor, and through the second resistor back to the alternator's field winding.

7. The electronic voltage regulator according to claim 6 wherein the first bipolar transistor of the error amplifier means comprises:
a first PNP transistor; wherein the second bipolar transistor of the output transistor means comprises:
a second PNP transistor with the diode between its collector and the ground, and across the field winding;
wherein the first resistor is connected to the base of the first PNP transistor;
wherein the second resistor bypasses the capacitor, and connects the diode to the first resistor;
whereby the direct current path from the alternator's field winding to the input port of the error amplifier proceeds via the source of reference voltage, through the alternator diodes and the battery that are in parallel, and to the emitter-base junction of the first PNP transistor;
whereby the direct current path proceeds further, in the closed circular loop back to the field winding, through the emitter-base junction of the first PNP transistor, through the first resistor, and through the second resistor back to the alternator's field winding.

8. The electronic voltage regulator according to claim 6 wherein the first bipolar transistor of the error amplifier means comprises:
a first NPN transistors; wherein the second bipolar transistor of the output transistor means comprises:
a second NPN transistor with the diode connected between its collector and the positive voltage terminal of the battery, and across the alternator's field winding;
wherein the first resistor is connected to the base of the first NPN transistor;

wherein the second resistor bypasses the capacitor, and connects the diode to the base of the first resistor;

whereby the direct current path from the alternator's field winding to the input port of the error amplifier proceeds via the second resistor and the first resistor and to the emitter-base junction of the first NPN transistor;

whereby the direct current path proceeds further, in the closed circular loop back to the alternator's field winding, through the emitter-base junction of the first NPN transistor through the alternator diodes and the battery that are in parallel back to the alternator's field winding.

9. The electronic voltage regulator according to claim 1 connected between the positive voltage terminal of the battery and a ground wherein the error amplifier means comprises:

a PNP bipolar transistor; wherein the output transistor means comprises:

a PNP bipolar transistor; wherein the capacitor means comprises;

a capacitor; and wherein the diode means comprises:

a diode with its anode connected to the capacitor and its cathode connected to the positive voltage terminal of the battery.

10. The electronic voltage regulator according to claim 1 connected between the positive voltage terminal of the battery and a ground wherein the error amplifier means comprises:

an NPN bipolar transistor; wherein the output transistor means comprises:

an NPN bipolar transistor; wherein the capacitor means comprises:

a capacitor; and wherein the diode means comprises:

a diode with its cathode connected to the capacitor and its anode connected to the ground.

11. An electronic voltage regulation and failure protection method for (i) producing with an in a voltage regulator a pulse-width-modulated signal across the field winding of an alternator while (ii) protecting an output transistor of the voltage regulator, which output transistor drives the pulse-width-modulated signal, which output transistor induced by an abnormally low impedance in the field winding of the alternator, the method comprising:

producing in an error amplifier of a voltage regulator, which error amplifier is connected across voltage terminals of a battery, an error signal in response to variations in a voltage of the battery between its terminals;

producing in an output transistor of the voltage regulator in response to the error signal a pulse-width-modulated signal;

feeding back in a capacitor feedback path an alternating current for the output transistor to the error amplifier; and discharging the capacitor through a diode to one of the terminals of the battery in a sense that provides a direct current path for discharging the capacitor when the output transistor is conducting;

whereupon any such times as the output transistor attempts to drive the pulse-width-modulated signal into any such abnormally low impedance as causes the current in the output transistor while it is conducting to rise precipitously, then the feedback path through the capacitor is, by action of its timely discharge through the diode, sufficiently fast enough, in conjunction with a response time of the error amplifier, so as to drive the output transistor to a non-conducting state before damage of the output transistor is sustained;

wherein, at a time after being so driven to the non-conducting state, the output transistor will recommence to conduct but will then so shortly thereafter be safely rendered non-conducting all over again so as to continuously preclude, in a self-oscillating manner, that it should ever be damaged;

wherein the voltage regulator is protected from induced catastrophic failure of the output transistor resultant from any attempt of the output transistor to drive into an abnormally low impedance.

12. The electronic voltage regulation and failure protection method according to claim 11 wherein the voltage regulator receives a reference voltage from a source of reference voltage, the method further comprising:

feeding back in a direct current feedback path the pulse-width-modulated signal from the output transistor to the error amplifier so as to couple a voltage generated from a magnetic field in a field winding of an alternator upon occasion of a loss of a reference voltage to the voltage regulator in a path proceeding from the alternator's field winding, back to the error amplifier, and further in a closed circular loop back to the alternator's field winding, the path serving to, incipiently upon such times as the voltage regulator loses the reference voltage, temporarily bias the error amplifier to conduction so as to temporarily cause non-conduction of the output transistor;

wherein the caused temporary non-conduction of the output transistor will in time, by action of the diode, cause a commencement of the self-oscillating;

wherein the voltage regulator is protected from catastrophic failure of the output transistor resultant form a loss of the reference voltage.

13. In an electronic voltage regulator for producing a pulse-width-modulated signal across the field winding of an alternator, the voltage regulator being connected across a battery that develops a voltage between a positive terminal and a negative terminal, the voltage regulator having an error amplifier, having a signal input port and a signal output port, for selectively conducting in response to variations in the battery voltage so as to produce an error output signal, the error amplifier connected by a direct current path from its signal output port to an output transistor, having a signal input port and a signal output port, responsive to the error output signal at its input port for selectively conducting so as to produce at its output port the pulse-width-modulated signal, and a capacitor for feeding back an alternating current in a feedback path proceeding form the output port of the output transistor to the signal input port of the error amplifier, an improvement to the voltage regulator directed to protecting the output transistor from a destructive overcurrent induced by a low impedance at its output port, the improvement comprising:

a diode, connecting the capacitor to one of the voltage terminals of the battery in a sense that provides a direct current path for discharging the capacitor when the output transistor is conducting, for rendering, in combination with the normal function of the error amplifier and during the presence of an abnormally low impedance at the output port of the output transistor, the output transistor periodically cyclically non-conducting in a self-oscillating manner, therein serving to continuously preclude that the output transistor should be damaged by overcurrent.

14. The electronic voltage regulator according to claim 13 wherein the voltage regulator receives a reference voltage from a source of reference voltage, the improvement further comprising:

a direct current feedback path means, connected between the output port of the output transistor and the input port of the error amplifier, for coupling, incipiently upon occasion of a loss of the reference voltage to the voltage regulator, a voltage generated from a magnetic field in the field winding of the alternator from the field winding to the input port of the error amplifier, and further in a closed circular loop back to the field winding;

wherein serving, incipiently upon such times as the voltage regulator loses the reference voltage, to temporarily bias the error amplifier to conduction so as to temporarily cause non-conduction of the output transistor;

wherein the caused temporary non-conduction of the output transistor will in time, by action of the diode, cause a commencement of the self-oscillating;

wherein the voltage regulator is protected from catastrophic failure of the output transistor resultant from a loss of the reference voltage.

* * * * *